United States Patent [19]
Yamada et al.

[11] Patent Number: 5,754,226
[45] Date of Patent: May 19, 1998

[54] IMAGING APPARATUS FOR OBTAINING A HIGH RESOLUTION IMAGE

[75] Inventors: Eiji Yamada, Tenri; Tetsuo Iwaki, Yamatokoriyama, both of Japan

[73] Assignee: Sharp Kabushiki Kaisha, Osaka, Japan

[21] Appl. No.: 574,612

[22] Filed: Dec. 19, 1995

[30] Foreign Application Priority Data

Dec. 20, 1994 [JP] Japan .................... 6-316825

[51] Int. Cl.$^6$ ............... H04N 5/225; H04N 7/18
[52] U.S. Cl. ............ 348/219; 348/155; 348/264; 348/340; 348/369
[58] Field of Search .................... 348/155, 207, 348/218, 219, 264, 335, 340, 343, 344, 369, 699; H04N 5/225, 7/18

[56] References Cited

U.S. PATENT DOCUMENTS

| | | | |
|---|---|---|---|
| 4,633,317 | 12/1986 | Uwira et al. | 358/213 |
| 4,641,038 | 2/1987 | Baker | 250/578 |
| 5,012,270 | 4/1991 | Sekine et al. | 354/430 |
| 5,363,136 | 11/1994 | Sztanko et al. | 348/207 |
| 5,371,539 | 12/1994 | Okino et al. | 348/207 |
| 5,561,460 | 10/1996 | Katoh et al. | 348/219 |

FOREIGN PATENT DOCUMENTS

| | | | |
|---|---|---|---|
| 56-40546 | 9/1981 | Japan | H04N 5/30 |
| 61-251380 | 11/1986 | Japan | H04N 5/225 |
| 4-172778 | 6/1992 | Japan | H04N 5/225 |

OTHER PUBLICATIONS

K. Enami et al., *The Transactions of the Institute of Electronics and Communications Engineers of Japan*, vol. J69-D, No. 11, pp. 1617–1623, 1986.

J.A. Parker et al., *IEEE Transactions on Medical Imaging*, vol. MI-2, No. 1, pp. 31–39, 1983.

*Primary Examiner*—Andrew Faile
*Assistant Examiner*—Ngoc-Yen Vu
*Attorney, Agent, or Firm*—David G. Conlin; William J. Daley, Jr.

[57] ABSTRACT

An imaging apparatus includes: an imaging plate having a light receiving face; focusing device for focusing light from a subject on the light receiving face of the imaging plate as the image formed on the light receiving face; image position displacing device for displacing a position of the image formed by the focusing device with respect to a reference position; image position displacement control device for controlling the image position displacing device; motion vector detecting device for detecting a motion vector of each image with respect to a reference image; and image synthesis device for displacing pixels constituting each image and for interpolating the displaced pixels constituting each image between adjacent pixels of the reference image, thereby synthesizing the images into a single image.

7 Claims, 10 Drawing Sheets

IMAGING APPARATUS FOR OBTAINING A HIGH RESOLUTION IMAGE

BACKGROUND OF THE INVENTION

1. Field of the Invention:

The present invention relates to an imaging apparatus capable of obtaining resolution surpassing resolution corresponding to the number of pixels of an imaging plate.

2. Description of the Related Art:

As shown in FIG. 9, an imaging apparatus for obtaining resolution surpassing resolution corresponding to the number of pixels of an imaging plate, which uses a pair of imaging plates 21 and 22, has been previously proposed, for example, in Japanese Patent Publication No. 56-40546.

In the imaging apparatus, image light L is split into two parts by a half mirror 23 so that one part of the image light L is incident on a light receiving face of one imaging plate 21 while the other part of the image light L is incident on a light receiving face of the other imaging plate 22 via a mirror 24. The light receiving faces of the imaging plates 21 and 22 have the same pixel arrangement, and form an image with the incident image light L at the same magnification. These light receiving faces are placed so that one part of image light L is incident on the position horizontally shifted by a half-pixel from the position on which the other part of incident image light L is incident. The imaging plates 21 and 22 operate in a synchronous manner with driving signals φ1 and φ2 respectively transmitted from a driving signal generating section 25. Phases of the driving signals φ1 and φ2 are shifted by 180 degrees from each other. Then, images output from the imaging plates 21 and 22 are alternately inserted for each pixel in a horizontal direction in a synthesis signal processing section 26, thereby synthesizing the images into a single image.

In the image thus synthesized in the synthesis signal processing section 26, horizontal resolution can be doubled as compared with that of each of the imaging plates 21 and 22 because a horizontal spatial sampling interval is reduced by half. By vertically shifting the positions, on which the two parts of incident image light L are respectively incident, by a half-pixel from each other, vertical resolution can be improved by being doubled.

As another imaging apparatus for obtaining resolution surpassing the resolution corresponding to the number of pixels of an imaging plate, an imaging apparatus using a single imaging plate 31 in time division as shown in FIG. 10 has been previously proposed, for example, in Japanese Laid-Open Patent Publication No. 61-251380.

In this imaging apparatus, when the image light L is incident onto a light receiving face of the imaging plate 31 via an optical system 32, the position of the optical system 32 or the imaging plate 31 can be changed by function of an image position displacing section 33 so as to displace the position of the image. A control section 34 controls the image position displacing section 33. Specifically, the position of the image is set at a reference position by the control section 34, and the first image is formed on the imaging plate 31. Then, the position of the image is horizontally shifted by a half-pixel from the reference position by the control section 34, and the second image is formed on the imaging plate 31. In the same manner, the position of the image is vertically shifted by a half-pixel from the reference position, so that the third image is formed on the imaging plate 31. In the same manner, the position of the image is both vertically and horizontally shifted by a half-pixel from the reference position, so that the fourth image is formed on the imaging plate 31. The four images thus formed on the imaging plate 31 are transmitted to an A/D conversion section 35 to be sequentially converted into digital signals. Then, the sequential digital signals are stored in an image memory 36. A signal corresponding to each pixel is output from the four images stored in the image memory 36 in turn, thereby synthesizing the four images into a single image.

In the synthesized image output from the image memory 36, doubled horizontal and vertical resolution is obtained as compared with that of the imaging plate 31 because horizontal and vertical spatial sampling intervals are respectively reduced by half.

As still another imaging apparatus for obtaining resolution surpassing resolution realized by the number of pixels of an imaging plate, an imaging apparatus which utilizes fluctuation spontaneously applied to an imaging plate 41 as shown in FIG. 11 has been previously proposed, for example, in Japanese Laid-Open Patent Publication No. 4-172778.

This imaging apparatus sequentially transmits images formed on the imaging plate 41 to an A/D conversion section 42 so as to convert the images into digital signals. Then, the digital signals are stored in an image memory 43. When a predetermined number (4 or more) of the images are stored in the image memory 43, one image is selected for each time to be transmitted to an interpolation image generation section 44 as a reference image. Each time the interpolation image generation section 44 receives the reference image, the interpolation image generation section 44 generates three interpolation images: the first interpolation image is obtained by horizontally displacing each pixel of the reference image by a half-pixel; the second interpolation image is obtained by vertically displacing each pixel of the reference image by a half-pixel; and the third interpolation image is obtained by both horizontally and vertically displacing each pixel of the reference image by a half-pixel. These three interpolation images are transmitted to a highly correlative image detecting section 45. Each time the highly correlative image detecting section 45 receives the interpolation image, the highly correlative image detecting section 45 detects the image which is the most highly correlative with the interpolation image among all images stored in the image memory 43 except the reference image. In this way, the reference image transmitted to the interpolation image generation section 44 and the three images, which are detected by the highly correlative image detecting section 45 based on the reference image, are transmitted to a synthesis section 46. Then, each pixel of the three images is inserted in turn between pixels of the reference image in the synthesis section 46, thereby obtaining a single image.

The synthesized image obtained in the above synthesis section 46 has doubled horizontal and vertical resolution as compared with that of the imaging plate 41 because the horizontal and vertical spatial sampling intervals are respectively halved.

However, the above-mentioned conventional imaging apparatuses have the following disadvantages.

The conventional imaging apparatus shown in FIG. 9 requires the two imaging plates 21 and 22 so as to double the resolution, and needs the half mirror 23 and the like as an optical system. As a result, it becomes difficult to fabricate an inexpensive, compact and light-weighted apparatus.

In the conventional imaging apparatus shown in FIG. 10, unless the image position displacing section 33 precisely displaces the position of the image by a half-pixel for each image, distortion is generated in the resultant image. Therefore, the mechanism of the image position displacing section 33 should have high accuracy. As a result, the apparatus becomes disadvantageously expensive. In addition, since the imaging apparatus uses one imaging plate 31 in time division, a shift in the position of the image occurs when a subject moves or the imaging apparatus moves while taking the images due to a movement of a hand holding the apparatus, resulting in distortion in the synthesized image. Moreover, a large shift may bring a possibility that the order of pixels is changed during a synthesizing process. As a result, an untrue synthesized image is disadvantageously obtained in some cases.

Furthermore, since the conventional imaging apparatus shown in FIG. 11 utilizes fluctuation spontaneously applied to the imaging plate 41, there is no guarantee that three images, which are vertically, horizontally or both vertically and horizontally shifted by a half-pixel from the reference image, are obtained without fail from a predetermined number of images. Therefore, if a high probability of obtaining such three images is, the number of images stored in the image memory 43 should be increased. As a result, a capacity of the image memory 43 is increased to render the imaging apparatus expensive. In addition, in the case where the imaging apparatus is perfectly fixed, an increase in the number of images stored in the image memory 43 does not produce any improvement. Moreover, in the general case of taking images, a correlation between images is usually lowered with elapse of time due to movement of a subject or change in the degree of illuminance. Therefore, there is no guarantee that images with a higher correlation can be obtained as the number of images stored in the image memory 43 is increased. Furthermore, while the number of images stored in the image memory 43 is increased, the possibility that part of a subject moves while taking these images becomes high. When such images are synthesized into a single image, an untrue synthesized image may be obtained because the order of pixels changes in the moved part of the subject.

In the conventional example shown in FIG. 11, a correlation for each image formed on the imaging plate 41 is detected. However, Moire fringes and the like appear in such unsynthesized images due to aliasing which occurs while spatially sampling the images by each pixel of the imaging plate 41. As a result, it becomes difficult to precisely determine a correlation. Furthermore, the resolution is disadvantageously lowered due to false detection of the correlation in some cases.

The reason why aliasing occurs in the unsynthesized images will be described below.

Since an imaging apparatus in general spatially samples an image formed on a light receiving face of the imaging plate by each pixel, a frequency band of a spatial frequency of the formed image should be previously limited, taking the sampling theorem into consideration. For this purpose, an optical lowpass filter such as a birefringence plate is used.

For comparison, the reason why aliasing does not occur in a general imaging apparatus having resolution corresponding to the number of pixels will be first described.

FIG. 12 illustrates, on the left, a waveform (spatial region) showing a variation in luminance of the image with respect to the horizontal position on a light receiving face of the imaging plate, and on the right, the variation in luminance as a frequency spectrum (frequency region) of a spatial frequency. A distance between adjacent pixels in a horizontal direction on the light receiving face of the imaging plate is denoted as $P_H$. In this case, the optical lowpass filter such as a birefringence plate previously removes frequency components higher than a spatial frequency of $1/(2P_H)$ in the image formed on the light receiving face. Therefore, when the image is spatially sampled at a sampling frequency of $1/P_H$ ($P_H$: sampling interval), which is twice as high as the spatial frequency of $1/(2P_H)$, an aliasing component A indicated with a broken line in a frequency spectrum does not appear in a region of spatial frequency of $1/(2P_H)$ and lower as shown in FIG. 13. Thus, aliasing does not occur. In the case of spatial sampling with such pixels as explained above, attenuation in a high frequency band occurs due to aperture effect as shown in FIG. 13 since a photosensitive region of the pixel has a certain length and a certain width.

Next, the reason why aliasing occurs in the case where horizontal resolution is doubled by synthesizing images will be described.

In this case, as shown in FIG. 14 and which is different from the above general imaging apparatus; the birefringence plate and the like removes only frequency components of a spatial frequency of $1/P_H$ or higher in an image formed on a light receiving face, and does not remove signal components in a region of a spatial frequency in the range of $1/(2P_H)$ to $1/P_H$. This is because resolution of $P_H$ or higher cannot be obtained from the image where the birefringence plate and the like removes frequency components of a spatial frequency of $1/(2P_H)$ and higher even if a sampling frequency is enhanced. Therefore, when the image, in which only frequency components of a spatial frequency of $1/P_H$ and higher are removed, is spatially sampled at a sampling frequency of $1/P_H$ ($P_H$ is a sampling interval), aliasing components indicated with a broken line in frequency spectra of FIG. 15 appears in a region having a frequency of $1/2P_H$ or lower. A hatched region in FIG. 15 appears as aliasing $A_N$. In this case, an actual signal is obtained as indicated by a solid line to which the aliasing $A_N$ indicated by the hatched region is added.

Also in the case where an image is spatially sampled while horizontally shifting the position of the image by a half-pixel ($P_H/2$), aliasing $A_N$ occurs in a hatched region as shown in frequency spectra of FIG. 16. Also in FIGS. 15 and 16, attenuation in a high frequency band commonly occurs during spatial sampling due to aperture effect.

In the spatially sampled images shown in FIGS. 15 and 16, sample points of each image for spatial sampling are shifted by a half-pixel ($P_H/2$) from each other. Therefore, a signal component having a center at a spatial frequency of $2n/P_H$ (n is an integer) of FIG. 15 has the same phase as that of FIG. 16 while a signal component having a center at a spatial frequency of $(2n+1)/P_H$ shown in FIG. 15 has a phase shifted by 180 degrees from that of a signal component shown in FIG. 16. In other words, while the signal components having a center at a spatial frequency of 0 has the same phase with each other, the aliasing components having a center at a spatial frequency of $1/P_H$ have the same amplitude of luminance and the phases shifted by 180 degrees from each other.

Thus, as shown in FIG. 17, when pixels of the respective images shown in FIGS. 15 and 16 are alternately positioned so as to synthesize the images into an image having a sampling frequency of $2/P_H$ (that is, a sampling interval of $P_H/2$), aliasing $A_N$ does not occur in a region having a spatial frequency of $1/P_H$ and lower because aliasing components $A_N$ of both images are counterbalanced. Aliasing components A in a region of a spatial frequency of $1/P_H$ and higher shown in FIG. 17 are signal components having a center at a spatial frequency of $2/P_H$, which are not counterbalanced.

As is understood from the above observation, when the frequency components to be removed by the birefringence plate and the like are limited to a high frequency band, aliasing $A_N$ does not occur in the synthesized image, but occurs in the unsynthesized images. As a result, Moire fringes and the like appear in the image. Therefore, when a correlation is detected for such unsynthesized images as described above, there arise a possibility that the detection of the correlation is rendered imprecise due to adverse effect of aliasing $A_N$.

SUMMARY OF THE INVENTION

According to one aspect of the invention the imaging apparatus includes: an imaging plate having a light receiving face, on which a plurality of light receiving elements are arranged at intervals of $P_H$ ($P_H$ is a positive real number) in a first direction and at intervals of $P_V$ ($P_V$ is a positive real number) in a second direction perpendicularly crossing the first direction, for imaging an image formed on the light receiving face during a predetermined period of time as an image constituted by a plurality of pixels; focusing means for focusing light from a subject on the light receiving face of the imaging plate as the image formed on the light receiving face; image position displacing means for displacing a position of the image formed by the focusing means with respect to a reference position by approximately $P_H \times i/H$ (H is a predetermined integer of 1 or greater; and i is an integer: $0 \leq i < H$) in the first direction and by approximately $P_V \times j/V$ (V is a predetermined integer of 1 or greater; and j is an integer: $0 \leq j < V$) in the second direction; image position displacement control means for controlling the image position displacing means each time the imaging plate images an image so as to displace the image to a position represented by a combination of i and j; motion vector detecting means for detecting a motion vector of each of (N−1) images (N=H×V) with respect to a reference image, using one of N images imaged by the imaging plate as the reference image; and image synthesis means for displacing pixels constituting each of the (N−1) images by a degree obtained by synthesizing the motion vector of each of the (N−1) images detected by the motion vector detecting means and a displacement vector of the position of each of the (N−1) images with respect to the reference image, and for interpolating the displaced pixels constituting each of the (N−1) images between adjacent pixels of the reference image, thereby synthesizing the N images into a single image.

According to another aspect of the invention, the imaging apparatus includes: an imaging plate having a light receiving face, on which a plurality of light receiving elements are arranged at intervals of $P_H$ ($P_H$ is a positive real number) in a first direction and at intervals of $P_V$ ($P_V$ is a positive real number) in a second direction perpendicularly crossing the first direction, for imaging an image formed on the light receiving face during a predetermined period of time as an image formed of a plurality of pixels; focusing means for focusing light from a subject on the light receiving face of the imaging plate as the image formed on the light receiving face; image position displacing means for displacing a position of the image formed by the focusing means with respect to a reference position by approximately $P_H \times i/H$ (H is a predetermined integer of 1 or greater; and i is an integer: $0 \leq i < H$) in the first direction and by approximately $P_V \times j/V$ (V is a predetermined integer of 1 or greater; and j is an integer: $0 \leq j < V$) in the second direction; motion vector detecting means, with respect to each pair of images among N image imaged by the imaging plate, for detecting a displaced image having the highest correlation with one of the pair of images from displaced images obtained by displacing each pixel constituting the other of the pair of images in the first direction and/or the second direction; image synthesis means for displacing pixels constituting the one image by a degree obtained by synthesizing the motion vector from the other image to the one image, which is detected by the motion vector detection means, and a displacement of a position of the one image from the other image, and for synthesizing the pair of images by repeating a process for interpolating each displaced pixel of the one image between adjacent pixels of the other image, thereby finally obtaining a single synthesized image.

Thus, the invention described herein makes possible the advantage of providing an imaging apparatus for obtaining a high resolution image in time division by using an inexpensive imaging plate and without displacing the position of the image with high precision, and not suffering from movement of a subject or a hand holding the imaging apparatus.

This and other advantages of the present invention will become apparent to those skilled in the art upon reading and understanding the following detailed description with reference to the accompanying figures.

DESCRIPTION OF THE PREFERRED EMBODIMENTS

Figure 1:
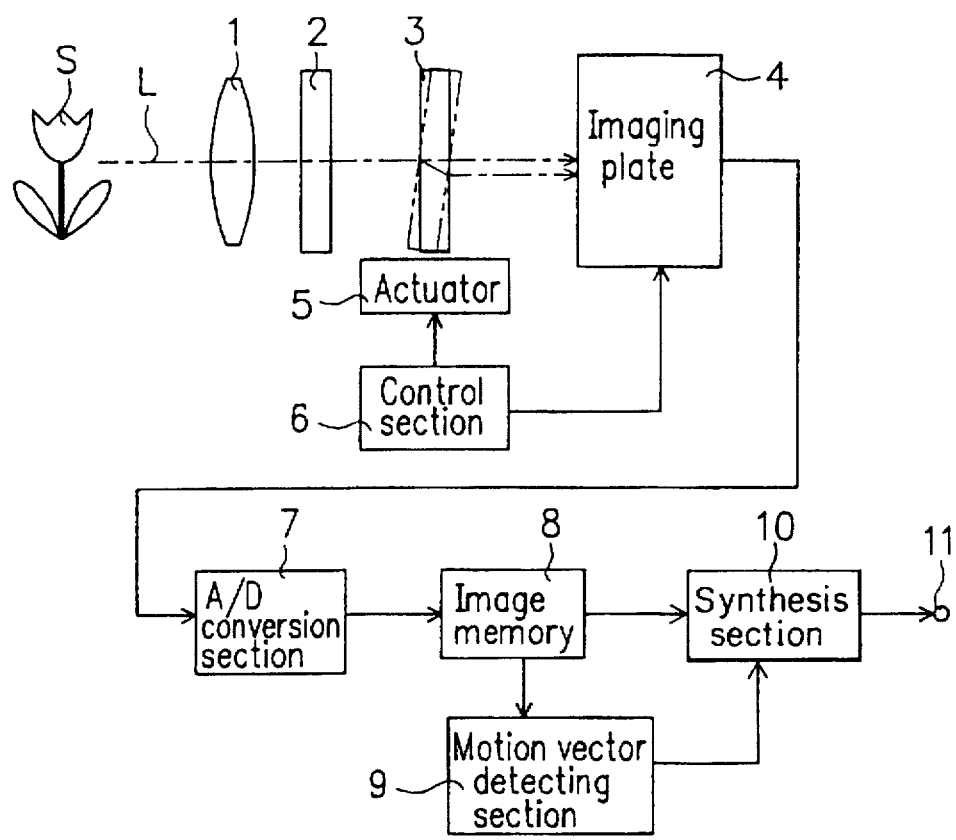
FIG. 1 is a block diagram showing the configuration of an imaging apparatus in accordance with an example of the present invention.

In an imaging apparatus according to the present invention, positions of N images formed on an imaging plate are displaced horizontally by one-Hth pixel and vertically by one-Vth pixel within one pixel. An image position displacing means changes a refractive index or an incident angle of a transparent refractive plate placed in an optical system and/or changes a reflection angle of an reflective plate to shift an optical axis, thereby displacing the position of the image to be formed. Alternatively, the position of the image can be displaced by translating the imaging plate itself in a horizontal direction and/or a vertical direction. By imaging N images, the imaging plate can obtain a still image. Furthermore, by repeatedly imaging N images in a continuous manner, a video image can be obtained.

A motion vector detecting means detects a displacement of the displaced image having the highest correlation with a reference image from the displaced images obtained by horizontally and/or vertically displacing each pixel of (N−1) images except the reference image. The displaced images described herein can include the image itself which is not substantially displaced.

Since the imaging position of each of the (N−1) images is displaced from the imaging position of the reference image, the reference image and each of the other images are shifted by less than one pixel. Moreover, in the case where the imaging position is imprecisely displaced by the image position displacing means, a shift of the imaging position indicates the position of the reference image shifted from the position of the actual image.

In addition, since each of (N−1) images is imaged at a different point of time from the time when the reference image is imaged, the image is shifted in the case where a subject moves or an imaging apparatus moves due to movement of a hand holding the apparatus.

The motion vector detecting means detects motion vectors based on the above-explained shifts of these images.

In the case where a displacement of each pixel is represented by an integral multiple of $P_H$ in a horizontal direction and an integral multiple of $P_V$ in a vertical direction, the image can be displaced only by shifting each real pixel. Normally, however, since the displacement is not represented by an integral multiple of a distance between pixels, interpolation processing is performed in order to displace each pixel. The interpolation processing can be realized in principle as follows.

A pixel having a density of 0 is interpolated between pixels so as to include a pixel at the displaced position of the sample points, and then is subjected to oversampling. Thereafter, a filtering process is conducted with a lowpass filter having a cutoff frequency which is half of a sampling frequency. Then, the pixels are thinned-out, leaving the pixel at the displaced position.

However, such a process requires oversampling with high speed and an enormous amount of calculations in the lowpass filtering. Therefore, it is generally appropriate to use linear interpolation based on four pixels around the interpolated pixel or cubic convolution interpolation based on sixteen pixels around the interpolated pixel. The linear interpolation corresponds to linear Lagrangian polynomial interpolation, and quadratic or higher degree Lagrangian polynomial interpolation or other interpolation processing can also be used.

The density of pixel herein indicates luminance of each pixel in the case of monochrome images, and indicates gradation (gray-scale) of each color of each pixel, or a luminance component (Y signal component) obtained by synthesizing the respective colors (converting a color image into a monochrome image) in the case of color images.

A correlation can be obtained, for example, based on a value obtained by calculating a difference in density between each pixel of the displaced image and each pixel of the reference image. In this case, the displaced image having the minimum accumulated value has the highest correlation.

However, if a difference in density of each pixel of each displaced image is calculated with respect to all pixels of the reference image, the amount of calculation becomes enormous. Thus, it is possible in the present invention to adopt a representative point matching method for taking pixels at a plurality of predetermined positions as representative points and then performing calculations with respect to the pixels of the representative points alone.

Alternatively, the correlation between the reference image and each image can be calculated based on a cross-correlation function. In this case, however, since the product of a density of each pixel of the reference image and a density of each pixel of each of the displaced images is accumulated, the highest correlation is obtained with the highest accumulated value. In the case where calculation is performed based on the cross-correlation function, the amount of calculation can be also reduced by limiting the range of displacement of the displaced images and by obtaining the product of densities only for representative points.

The motion vector detecting means detects the displacement of the displaced image having the highest correlation as a motion vector. The motion vector indicates a direction of displacement with a direction of a vector, and a distance of displacement with an absolute value of the vector. Specifically, assuming that a displacement component in a horizontal direction is x and a displacement component in a vertical direction is y, the displacement is represented as a vector (x, y) in a vector quantity (i.e., in a list or an array). The displacement itself is also a vector.

The image synthesis means displaces, with respect to each of the (N−1) images except the reference image, each pixel of the particular image by the degree obtained by synthesizing a motion vector of the particular image and a displacement of the imaging position thereof. Also in this case, each pixel is displaced by interpolation processing similar to the above processing. A motion vector detected by the motion vector detecting means indicates a shift of the position of the image due to displacement of the imaging position even in the case where a subject or an imaging apparatus does not move. Therefore, in this case, since a motion vector of each image and a displacement of the imaging position are counterbalanced with each other by synthesizing vectors, each pixel of the image is not required to be displaced from its original position.

On the other hand, in the case where a subject or an imaging apparatus moves, the part corresponding to displacement of the imaging position is counterbalanced with each other in a motion vector of each image. Thus, it is possible to obtain an actual motion vector in the image by synthesizing the vectors.

In the case where the imaging position is imprecisely displaced by the image position displacing means, the displacement is treated in the same way as that for treating displacement due to movement of a subject or an imaging apparatus, since a shift of position of the image caused by the image position displacing means is not perfectly offset by displacement of the imaging position which is previously given as a design value. Specifically, an actual motion vector of the image contains a component of shift from such a design value of the imaging position. When each pixel is displaced by the actual motion vector for each of the (N–1) images, it is possible to obtain the image with the position displaced as indicated with a design value, excluding the movement of a subject or an imaging apparatus.

In the case where the position of an image is precisely displaced by the image position displacing means, and a subject and an imaging apparatus do not move; each pixel is displaced by a synthesis vector (0, 0), resulting in no interpolation processing being required. Also in other cases, when the displacement is only represented by an integral multiple of a pixel interval, it is only necessary to shift the position of a real pixel. Therefore, actual interpolation processing is not needed.

The image synthesizing means displaces pixels for each of the (N–1) images as described above, then synthesizes the images by interpolating these displaced pixels between the adjacent pixels of the reference image to obtain a single image. Thus, since the synthesized image has the number of pixels obtained by multiplying the number of pixels of the reference image by N (=H×V), the synthesized image has a horizontal spatial sampling interval of $P_H/H$ and a vertical spatial sampling interval of $P_V/V$.

As a result, according to the present invention, by imaging N pictures while shifting the positions of the images, a image having horizontal resolution improved by H times and vertical resolution improved by V times can be obtained. Furthermore, even in the case where a subject moves or an imaging apparatus moves due to movement of a hand holding the apparatus; an image with high resolution can be obtained by correcting a shift of the image due to such movement. In addition, in the case where the imaging position is imprecisely displaced by the image position displacing means, a shift of the image can be corrected in the same way as that for correcting the movement of a subject or the like.

In the case where a motion vector detecting means does not obtain a displaced image with a sufficiently high correlation due to, for example, movement of a subject beyond the range of displacement of the displaced image, the imaging apparatus according to the present invention can perform processing so that an image synthesis means does not use the image with an insufficient correlation for synthesis.

In the case of video images (motion picture), according to a method for producing one synthesized image from N images, it is necessary to take N pictures in a time period of one field. However, by synthesizing each of the N pictures as a reference image so that the images are synthesized based on each reference image, N synthesis images with high resolution arranged in time sequence can be obtained. As a result, it becomes possible to take each of the N pictures for each field.

Instead of determining a reference image, images can be paired off. A relative motion vector between the pair of images is detected, and then the pair of images are sequentially synthesized into an image. In this case, however, it is necessary to determine each pair of the images in a tree configuration from one image as a root. In addition, it is necessary to repeat a process for displacing each pixel for the image obtained by displacing each pixel of images and then synthesizing the images. As a result, the amount of calculation increases. A pair of images can be synthesized after synthesizing a relative motion vector and a relative displacement of the position of image with respect to all the images back to a root.

In the case where horizontal and vertical resolutions are enhanced by synthesizing a plurality of images as described above, it is necessary to include a high frequency component of $1/(2P_H)$ or higher in a horizontal spatial frequency and a high frequency component of $1/(2P_V)$ or higher in a vertical spatial frequency in the image formed on the light receiving face even when each image is formed on the light receiving face. However, when the image containing such a high frequency component is spatially sampled at a sampling frequency of $1/P_H$ and $1/P_V$, aliasing appears. When a motion vector is detected based on this result, it becomes difficult to precisely detect a motion vector due to the effect of aliasing. However, since aliasing is caused due to an aliasing component having a center at a horizontal spatial frequency of $1/P_H$ and a vertical spatial frequency of $1/P_V$, the level of aliasing generally increases in a higher frequency band. Therefore, when a motion vector is detected after a filtering process for removing a high frequency component for each of (N–1) images, adverse effect due to aliasing can be reduced. Herein, since a high frequency component removed by a filter corresponds to an image having sampling frequencies of $1/P_H$ and $1/P_V$, such a high frequency component represents a frequency region having spatial frequencies around, but smaller than, $1/(2P_H)$ and $1/(2P_V)$.

Hereinafter, examples of the present invention will be described with reference to drawings.

Figure 2:
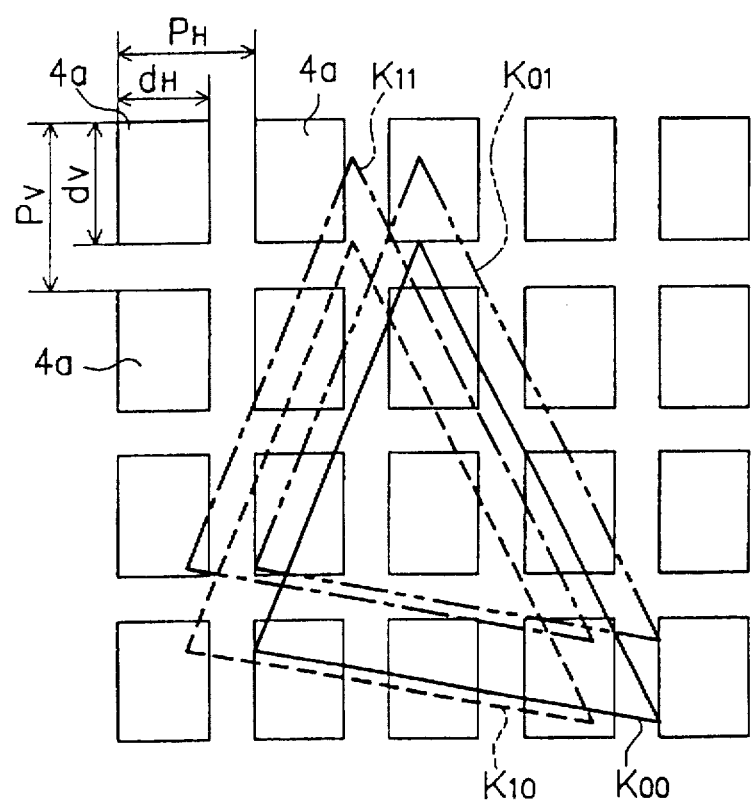
FIG. 2 is a plan view showing the relationship between a pixel arrangement of an imaging plate and images formed on a light receiving face in accordance with an example of the present invention.
Figure 3:
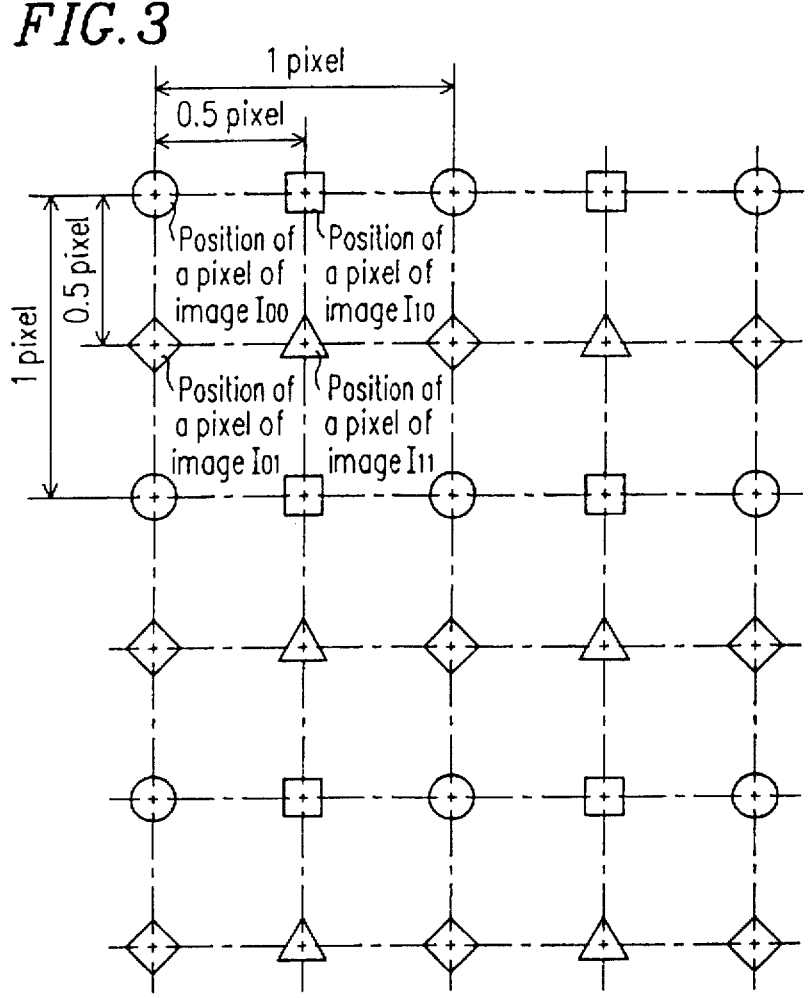
FIG. 3 is a plan view showing the positional relationship among pixels of four images in accordance with an example of the present invention.
Figure 4:
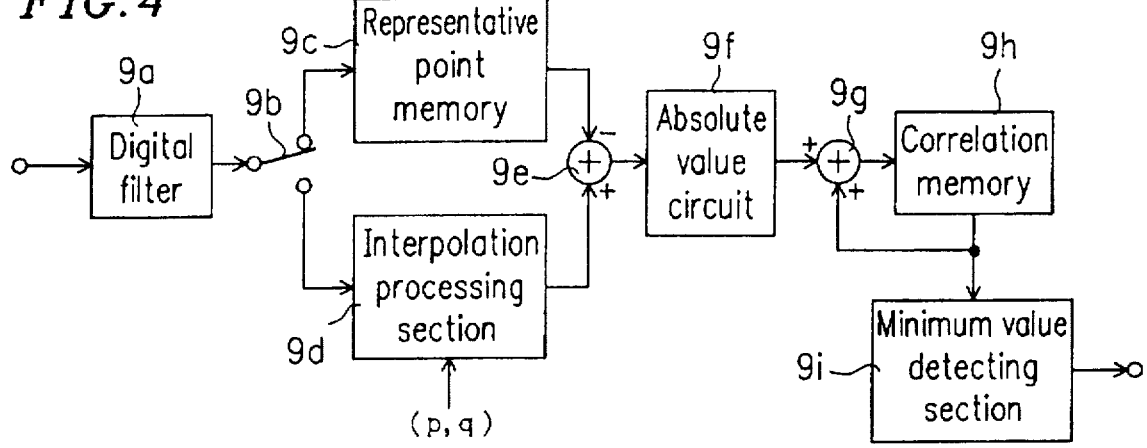
FIG. 4 is a block diagram showing the configuration of a motion vector detecting section in accordance with an example of the present invention.
Figure 5:
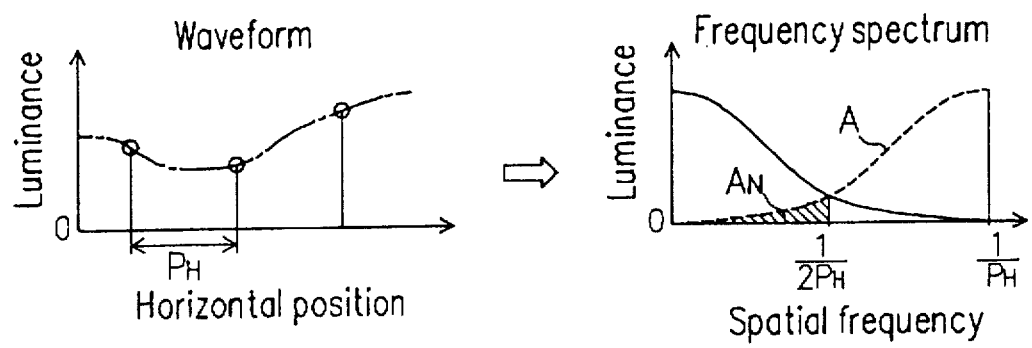
FIG. 5 is a graph showing a waveform and a frequency spectrum of an image formed on a light receiving face in accordance with an example of the present invention.
Figure 6:
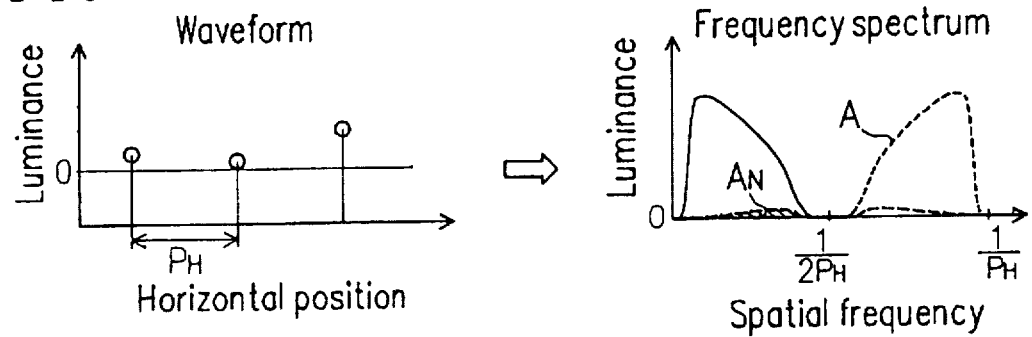
FIG. 6 is a graph showing a waveform and a frequency spectrum of the image which is obtained by spatially sampling the image of FIG. 5 and then output it from a digital filter in accordance with an example of the present invention.
Figure 7:
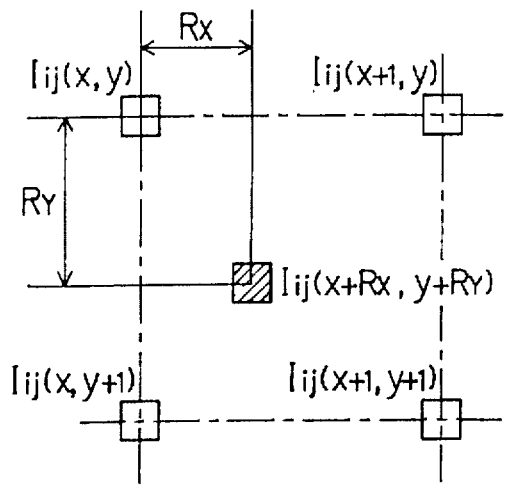
FIG. 7 is a diagram illustrating a linear interpolation processing for detecting a motion vector in accordance with an example of the present invention.
Figure 8:
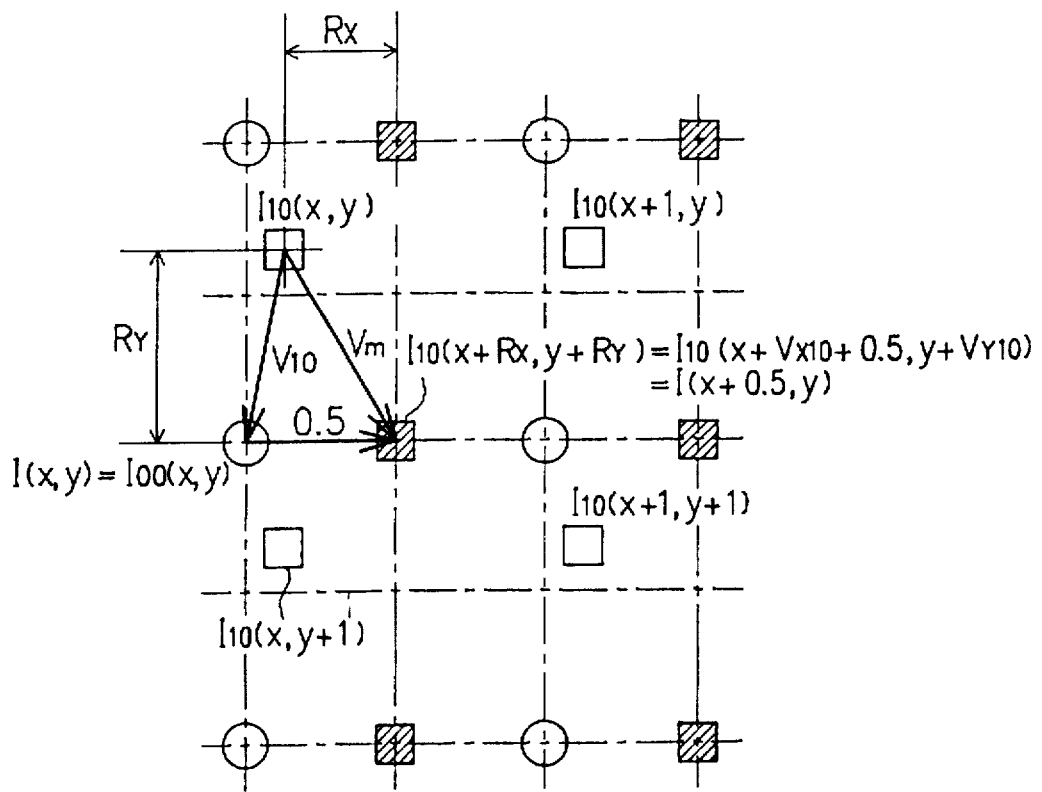
FIG. 8 is diagram illustrating an interpolation processing of pixels for synthesizing images in accordance with an example of the present invention.
Figure 9:
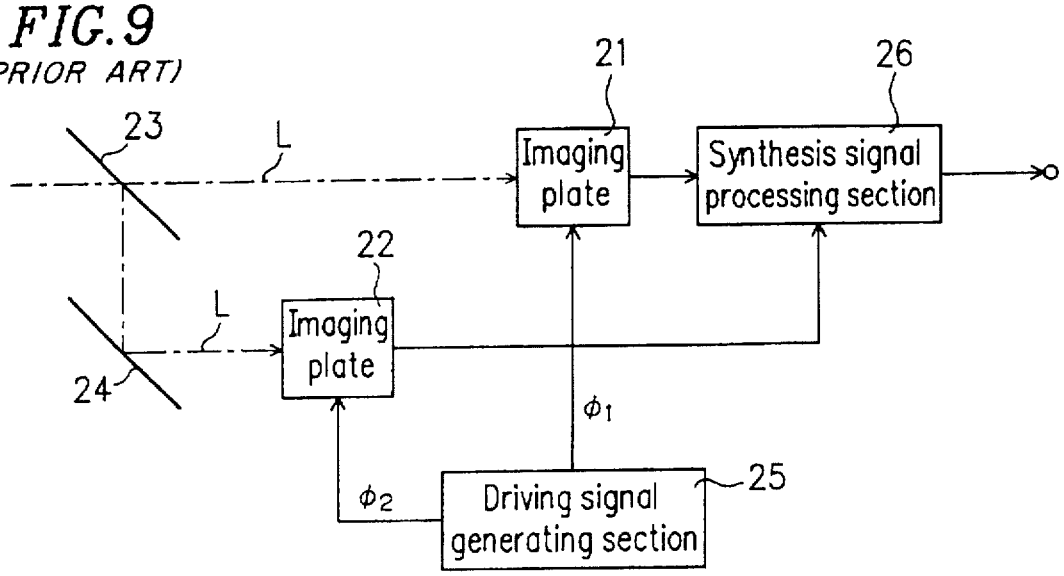
FIG. 9 is a block diagram illustrating the configuration of an imaging apparatus in accordance with a first conventional example.
Figure 10:
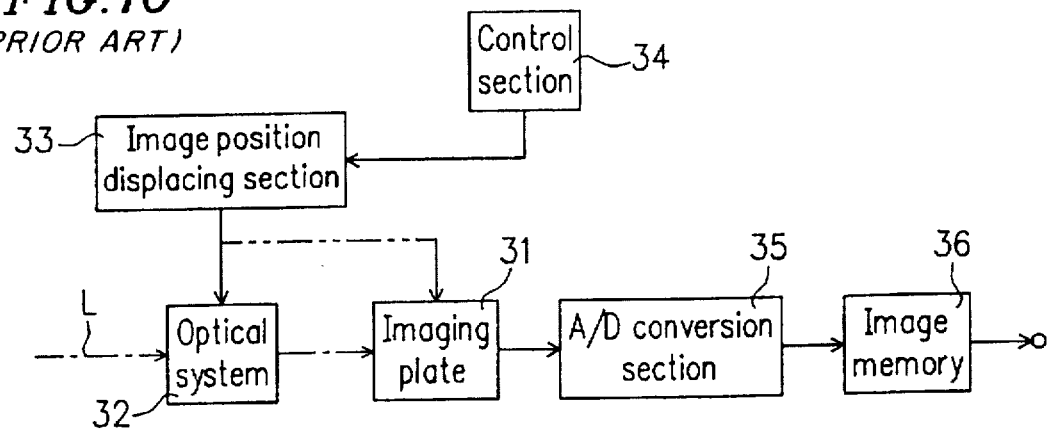
FIG. 10 is a block diagram illustrating the configuration of an imaging apparatus in accordance with a second conventional example.
Figure 11:
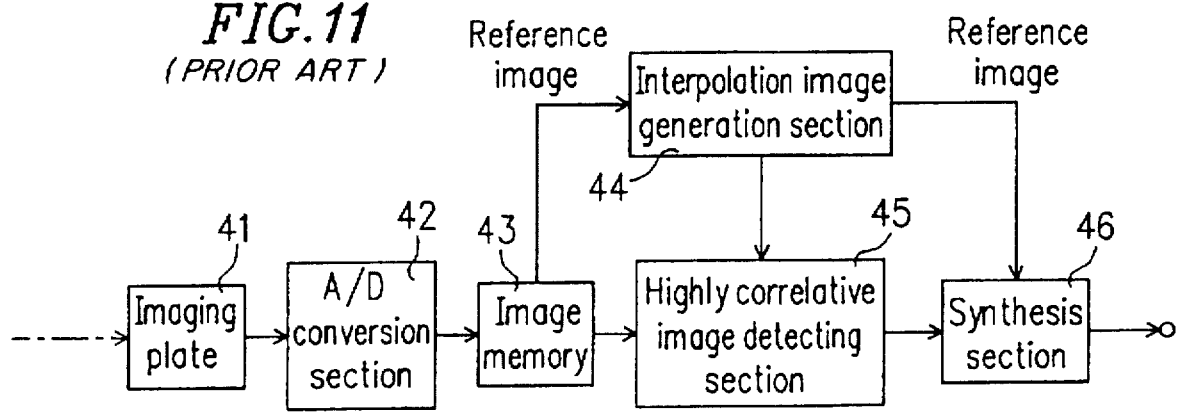
FIG. 11 is a block diagram illustrating the configuration of an imaging apparatus, showing a third conventional example.
Figure 12:
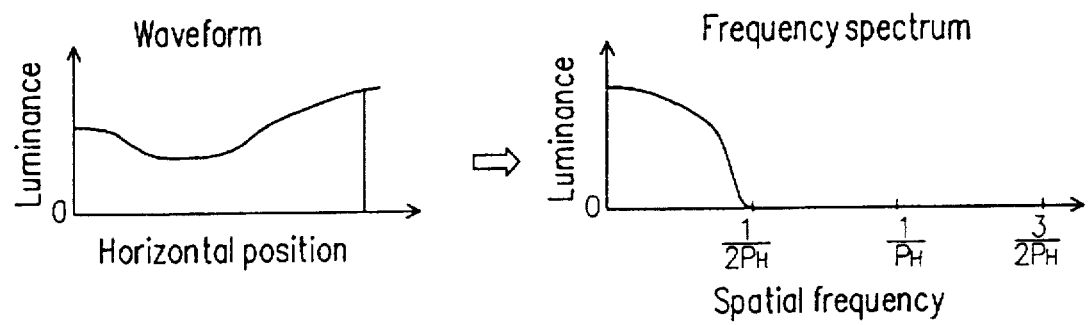
FIG. 12 is a graph illustrating a waveform and a frequency spectrum of an image formed on a light receiving face in a general imaging apparatus.
Figure 13:
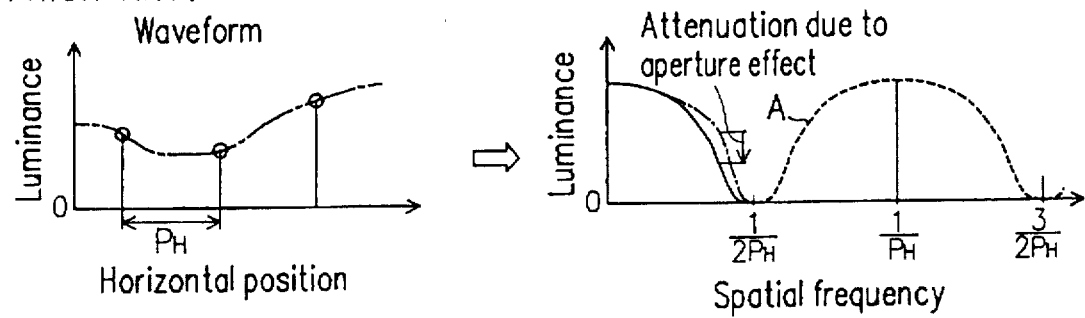
FIG. 13 is a graph illustrating a waveform and a frequency spectrum of an image obtained by spatially sampling the image of FIG. 12.
Figure 14:
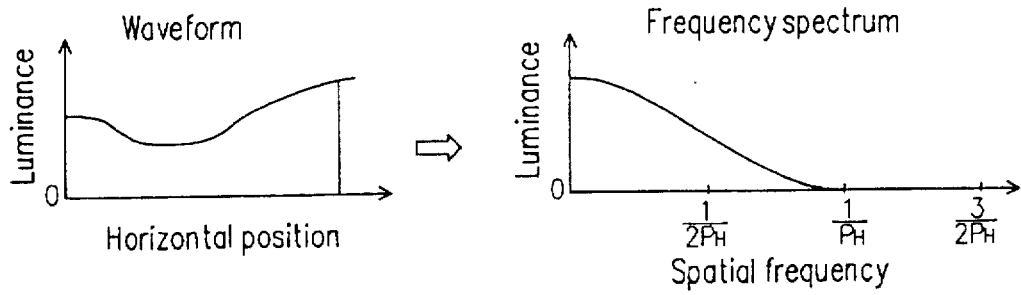
FIG. 14 is a graph illustrating a waveform and a frequency spectrum of an image formed on a light receiving face in an imaging apparatus capable of obtaining doubled horizontal resolution.
Figure 15:
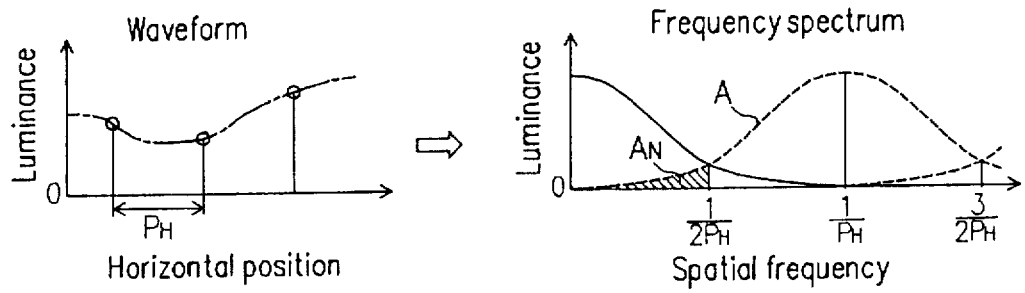
FIG. 15 is a graph illustrating a waveform and frequency spectra of an image obtained by spatially sampling the image of FIG. 14.
Figure 16:
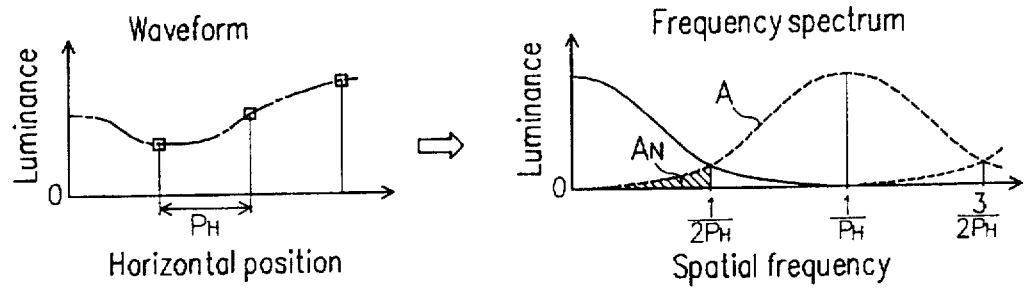
FIG. 16 is a graph illustrating a waveform and frequency spectra of an image obtained by spatially sampling the image of FIG. 14 while shifting the image by a half-pixel.
Figure 17:
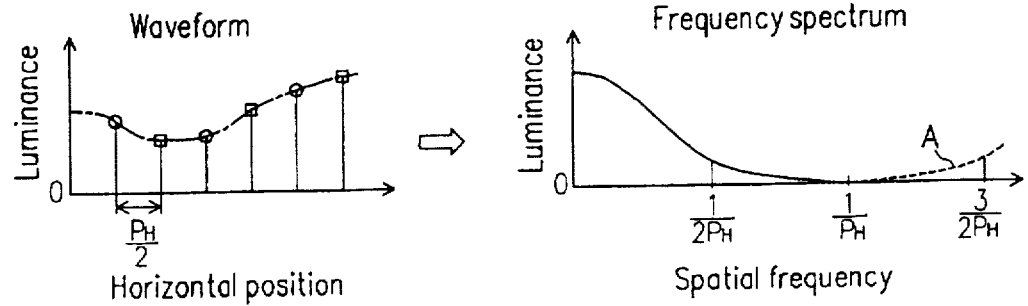
FIG. 17 is a graph showing a waveform and a frequency spectrum of an image obtained by synthesizing the images of FIGS. 15 and 16.

FIGS. 1 through 8 show an example of the present invention. FIG. 1 is a block diagram showing the configuration of an imaging apparatus. FIG. 2 is a plan view showing the relationship between the pixel arrangement of an imaging plate and images formed on a light receiving face. FIG. 3 is a plan view showing the positional relationship among pixels of four images. FIG. 4 is a block diagram showing the configuration of a motion vector detecting section. FIG. 5 illustrates graphs showing a waveform and frequency spectra of an image formed on a light receiving face. FIG. 6 illustrates a graph showing a waveform and frequency spectra of an image which is spatially sampled and then output from a digital filter. FIG. 7 shows a graph illustrating a linear interpolation processing of pixels for detecting a motion vector. FIG. 8 is an interpolation processing of pixels for synthesizing images.

In this example, an imaging apparatus for synthesizing four images which are imaged while shifting their positions respectively by a half-pixel ($P_H/2$, $P_V/2$; H=2, V=2, N=H×V=4) will be described.

As shown in FIG. 1, the imaging apparatus has such a configuration that imaging light L from a subject S is incident on an imaging plate 4 via a lens 1, a birefringence plate 2 and a transparent refracting plate 3. The lens 1 is an optical system for focusing the imaging light L on a light receiving face of the imaging plate 4. The birefringence plate 2 is an optical system for blocking only high frequency components in a spatial frequency of the imaging light L. In this case, a horizontal spatial frequency of $1/P_H$ and a vertical spatial frequency of $1/P_V$ serve as cutoff frequencies, so that frequency components higher than the cutoff frequencies are removed.

A spatial frequency component tends to more attenuate in a higher spatial frequency range due to Modulation transfer function (MTF) of the lens 1 or aperture effect of the imaging plate 4. Therefore, when frequency components higher than the cutoff frequencies are sufficiently attenuated so as not to affect imaging, the birefringence plate 2 can be omitted.

The transparent refracting plate 3 is a transparent plate-shaped optical system having a certain thickness and a certain refractive index, and is movably supported so as to be inclined with respect to horizontal and vertical directions in the light receiving face of the imaging plate 4.

The imaging plate 4 is a CCD imaging device or other solid-state imaging device. As shown in FIG. 2, on the light receiving face thereof, a number of pixels $4a$ (shown in FIG. 2) are arranged at intervals of $P_H$ in a horizontal direction and at intervals of $P_V$ in a vertical direction. These pixels $4a$ thus spatially sample the image formed on the light receiving face at a sampling frequency of $1/P_H$ in a horizontal direction and at $1/P_V$ in a vertical direction. Cutoff frequencies of the birefringence plate 2 are identical with these sampling frequencies. A light sensitive region of each pixel $4a$ is formed to have a width $d_H$ ($0<d_H \leq P_H$) in a horizontal direction and a length $d_V$ ($0<d_V \leq P_V$) in a vertical direction, and therefore attenuation in a high frequency band due to aperture effect occurs during spatial sampling because of these width and length.

As shown in FIG. 1, the transparent refracting plate 3 can be moved by an actuator 5. Specifically, for example, part of the transparent refracting plate 3 and the actuator 5 constitute a voice coil motor or a solenoid. The actuator 5 can vary an angle of inclination of the transparent refracting plate 3 in accordance with a current flowing through the actuator 5. The actuator 5 can be consist of a piezoelectric element, so that movement induced by distortion, which occurs upon application of a voltage, or movement of other mechanical structures is directly transmitted to the transparent refracting plate 3 so as to change an angle of inclination.

When an angle of inclination changes in this way, the incident image light L is refracted in accordance with the angle of inclination so as to shift the position of an image formed on the light receiving face of the imaging plate 4. The actuator 5 changes an angle of inclination of the transparent refracting plate 3, so that an image $K_{10}$ horizontally shifted by a half-pixel ($P_H/2$), an image $K_{01}$ vertically shifted by a half-pixel ($P_V/2$), and an image $K_{11}$ both horizontally and vertically shifted by a half-pixel ($P_H/2$, $P_V/2$) can be formed with respect to a reference image $K_{00}$ formed at a reference position.

As shown in FIG. 1, the actuator 5 and the imaging plate 4 can be controlled by a control signal from a control section 6. Specifically, the actuator 5 and the imaging plate 4 are controlled so as to perform the following process. First, when the reference image $K_{00}$ is formed at a reference position of the imaging plate 4, the imaging plate 4 outputs a reference image $I_{00}$. Then, when the images $K_{10}$, $K_{01}$ and $K_{11}$ are successively formed, the imaging plate 4 output images $I_{10}$, $I_{01}$ and $I_{11}$ in this order. It is assumed that the subject S keeps still, the imaging apparatus does not move due to slight movement of a hand holding the apparatus or the like, and the images $K_{00}$ through $K_{11}$ are respectively formed at accurate positions. When the four images $I_{00}$, $I_{10}$, $I_{01}$ and $I_{11}$ are overlapped regarding the images $K_{00}$, $K_{10}$, $K_{01}$ and $K_{11}$ as references, pixels of the respective images $I_{00}$, $I_{10}$, $I_{01}$ and $I_{11}$ are placed in turn at intervals of a half-pixel as shown in FIG. 3. When the images $I_{00}$, $I_{10}$, $I_{01}$ and $I_{11}$ are synthesized into a single image, horizontal and vertical sampling frequencies are respectively doubled. In FIG. 3, a circle, a square, a rhombus, and a triangle respectively indicate positions of pixels of the reference image $I_{00}$, the image $I_{10}$, the image $I_{01}$ and the image $I_{11}$.

Besides the use of the transparent refracting plate 3 and the actuator 5 described in this example, an angle of inclination of a reflection mirror can be varied, or an optical axis can be shifted by combining a birefringence plate and a polarizer as an image position displacing means. Alternatively, the position of the image can be shifted by translating the imaging plate 4 itself.

The images output from the imaging plate 4 are transmitted to an image memory 8 via an A/D conversion section 7 as shown in FIG. 1. The A/D conversion section 7 quantizes luminance data of the images spatially sampled by the imaging plate 4 for each pixel so as to convert the data into digital signals. The image memory 8 stores the four images $I_{00}$, $I_{10}$, $I_{01}$ and $I_{11}$ which are converted into the digital signals in the A/D conversion section 7. Then, the four images $I_{00}$, $I_{10}$, $I_{01}$ and $I_{11}$ stored in the image memory 8 are transmitted to a motion vector detecting section 9 and a synthesis section 10.

The motion vector detecting section 9 detects motion vectors of the images $I_{10}$, $I_{01}$ and $I_{11}$ with respect to the reference image $I_{00}$. The synthesis section 10 synthesizes the four images $I_{00}$, $I_{10}$, $I_{01}$ and $I_{11}$ based on the motion vectors detected in the motion vector detecting section 9. The image synthesized in the synthesis section 10 is externally output from an output terminal 11. The output image is recorded in a digital VTR or is subjected to a D/A conversion to be displayed on a display. The control section 6 outputs control signals (not shown) to the A/D conversion section 7, the image memory 8 and the motion vector detecting section 9, so that these sections operate in a synchronous manner.

The operation of the motion vector detecting section 9 will be described.

First, a plurality of displaced images for each of the three images $I_{10}$, $I_{01}$ and $I_{11}$, except the reference image $I_{00}$, are produced. The displaced images are obtained by appropriately horizontally and vertically displacing pixels of the images $I_{10}$, $I_{01}$ and $I_{11}$. Then, the motion vector detecting section 9 detects a displaced image having the highest correlation with the reference image $I_{00}$ from these displaced images.

Herein, it is assumed that each of the images $I_{00}$, $I_{10}$, $I_{01}$ and $I_{11}$ has $N_H$ pixels in the horizontal direction and $N_V$ pixels in the vertical direction. Moreover, i and j are 0 or 1, respectively, and the luminance of a pixel on a coordinate (x, y) in an image $I_{ij}$ is represented by $I_{ij}$ (x, y). In this case, x is an integer in the range of $1 \leq X \leq N_4$, and y is an integer in the range of $1 \leq y \leq N_V$. Therefore, a pixel corresponding to $I_{ij}$ (x, y) represents a real pixel on a sample point.

A correlation $R_{ij}$ (p, q) between the displaced image $I_{ij}$ obtained by displacing each pixel of the image $I_{ij}$ (excluding the image $I_{00}$) by a vector (p, q) and the reference image $I_{00}$ can be calculated based on, for example, Expression 1.

$$R_{ij}(p,q) = \sum_{x=i}^{N_H} \sum_{y=i}^{N_V} |I_{ij}(x+p, y+q) - I_{00}(x,y)| \quad \text{[Expression 1]}$$

If the difference in luminance is calculated for all pixels, the amount of calculation would be enormous. Therefore, the motion vector detecting section 9 selects 100 real pixels $I_{ij}$ ($x_k$, $Y_k$) ($1 \leq k \leq 100$) as representative points from each image $I_{ij}$. Then, a correlation $R_{ij}$ (p, q) is calculated by a representative point matching method expressed by Expression 2.

$$R_{ij}(p,q) = \sum_{k=1}^{100} |I_{ij}(x_k+p, y_k+q) - I_{00}(x_k, y_k)| \quad \text{[Expression 2]}$$

In this way, for each image $I_{ij}$, a correlation $R_{ij}$(p, q) with respect to the reference image $I_{00}$ is calculated for each of all combinations of p and q in a predetermined range so as to detect the combination of p and q having the minimum correlation. The vector (p, g) having the minimum correlation $R_{ij}$(p, q) is denoted as a motion vector $V_{ij}(V_{xij}, V_{yij})$. The image $I_{ij}$ has the highest correlation with the reference image $I_{00}$ when each pixel is displaced by the motion vector $V_{ij}(V_{xij}, V_{yij})$. Thus, the motion vector detecting section 9 detects the motion vector $V_{ij}(V_{xij}, V_{yij})$ for each of the three images $I_{10}$, $I_{01}$ and $I_{11}$, except the reference image $I_{00}$.

For example, under the conditions in which the subject S keeps still, the imaging apparatus does not move due to slight movement of a hand or the like, and the position of the image is precisely displaced; motion vectors $V_{10}$, $V_{01}$ and $V_{11}$ of the images $I_{10}$, $I_{01}$ and $I_{11}$ are $V_{10}$ (−0.5, 0), $V_{01}$ (0, −0.5) and $V_{11}$ (−0.5, −0.5), respectively. In other words, the motion vector represents only a displacement of the position of the image.

The number of representative points in the above representative point matching method is not limited to 100. With the increased number of representative points, the result approaches the result obtainable with the calculation expressed by Expression 1, and is hardly effected by a S/N ratio (signal to noise ratio) of the image. As a result, detection precision can be enhanced. However, the amount of calculation increases in proportion to the number of representative points. Thus, it is necessary to select an appropriate number of representative points to represent an equilibrium between the detection precision and the amount of calculation into consideration. Alternatively, a correlation can be calculated based on a cross-correlation function.

A specific example of the configuration of the motion vector detecting section 9 will be described with reference to FIG. 4.

Each of the images $I_{00}$, $I_{10}$, $I_{01}$ and $I_{11}$ from the image memory 8 are transmitted to a selector 9b via a digital filter 9a. The digital filter 9a is a band pass filter provided for improving the precision of detection of the correlation.

Specifically, a low frequency band of each of the images $I_{00}$, $I_{10}$, $I_{01}$ and $I_{11}$ is removed, thereby eliminating the effect of flicker or shading. By removing a high frequency band, the effect of noise as well as the effect of aliasing can be reduced.

More specifically, aliasing occurs in the images $I_{00}$, $I_{10}$, $I_{01}$ and $I_{11}$ before being synthesized. In general, aliasing has a larger amplitude in a higher frequency band. By removing the high frequency band with the digital filter 9a, the effect of aliasing is reduced. In addition, the detection precision of a correlation due to Moire fringes can be prevented.

FIG. 5 shows a waveform and frequency spectra of the images $I_{00}$, $I_{10}$, $I_{01}$ and $I_{11}$ to be input to the digital filter 9a. In FIG. 5, the waveform and the frequency spectra only in a horizontal direction are shown.

These images $I_{00}$, $I_{10}$, $I_{01}$ and $I_{11}$ are obtained by spatially sampling, with a sampling frequency $1/P_H$, the images $K_{00}$, $K_{10}$, $K_{01}$ and $K_{11}$ which have passed the birefringence plate 2, in which signal components in a region having a spatial frequency in the range of $1/(2P_H)$ to $1/P_H$ are not removed. Since the images $K_{00}$, $K_{10}$, $K_{01}$ and $K_{11}$ are spatially sampled at a sampling frequency of $1/P_H$, an aliasing component having a peak at a sampling frequency of $1/P_H$ appears in the region having a spatial frequency of $1/2P_H$ and lower. As a result, aliasing $A_N$ occurs. As shown in FIG. 6, however, luminance of the images $I_{00}$, $I_{10}$, $I_{01}$ and $I_{11}$ output from the digital filter 9a approaches 0 by removing a low frequency band. Then, by removing a high frequency band, an amplitude of aliasing is reduced. Therefore, when a correlation is calculated based on the images $I_{00}$, $I_{10}$, $I_{01}$ and $I_{11}$, detection can be performed with high precision.

As shown in FIG. 4, each of the images $I_{00}$, $I_{10}$, $I_{01}$ and $I_{11}$ passing through the digital filter 9a is selectively distributed to a representative point memory 9c or an interpolation processing section 9d. Specifically, the reference image $I_{00}$ is transmitted to the representative point memory 9c via the selector 9b. The other three images $I_{10}$, $I_{01}$ and $I_{11}$ are sent to the interpolation processing section 9d via the selector 9b. The representative point memory 9c selects 100 pixels $I_{00}$ ($x_k$, $y_k$) as representative points from the reference image $I_{00}$. The interpolation processing section 9d displaces 100 pixels $I_{ij}$ ($x_k$, $y_k$) by a vector (p, q), respectively, for each of the images $I_{10}$, $I_{01}$ and $I_{11}$ to convert the pixels $I_{ij}$ ($x_k$, $y_k$) into pixels $I_{ij}$ ($x_k$+p, $y_k$+q). All combinations of vector (p, q) are sequentially input to the interpolation processing section 9d. Each time a new combination of a vector (p, q) is input, the image memory 8 repeatedly transmits the image $I_{10}$ to the motion vector detecting section 9. When all vector combinations (p, q) are transmitted to the motion vector detecting section 9, the subsequent image $I_{01}$ and then the last image $I_{11}$ are repeatedly and sequentially transmitted to the motion vector detecting section 9 in a similar manner.

The experiments conducted by the inventors reveals that a motion vector in this example requires detection precision of ±0.05 pixel. Therefore, the above vector (p, q) should have a pitch of 0.05 pixel. As a result, a pixel $I_{ij}$ ($x_k$+p, $y_k$+q) is not present as a real pixel because $x_k$+p and $y_k$+q include the numbers under the decimal place. Therefore, the interpolation processing section 9d predicts the pixel $I_{ij}$ ($x_k$+p, $y_k$+q) by interpolation processing so as to displace the pixels.

This interpolation processing is realized in principle as follows. A pixel having luminance of 0 is interpolated between real pixels so as to include the pixel $I_{ij}$ ($x_k$+p, $y_k$+q) in the sample points. Then, the pixels are subjected to oversampling. Thereafter, after being processed with a low-pass filter having a horizontal spatial frequency of $1/(2P_H)$ and a vertical spatial frequency of $1/(2P_V)$ as cutoff frequencies, the pixels are subjected to a digital-digital conversion for performing a thinning out process so as to leave the pixel ($x_k$+p, $y_k$+q) alone. However, since such a process requires oversampling with high speed and an enormous amount of calculations in the lowpass filter, linear interpolation or cubic convolution interpolation is used in the interpolation processing section 9d of this example.

The linear interpolation is a method for interpolating a pixel in four pixels $I_{ij}$ around the pixel to be interpolated, based on these pixels. As shown in FIG. 7, it is assumed that a horizontal distance and a vertical distance between adjacent pixels are respectively 1. In the case where a pixel $I_{ij}$ $(x+R_X, y+R_Y)$ displaced from a real pixel $I_{ij}$ $(x, y)$ by a vector $(R_X, R_Y)$ is to be interpolated, the luminance of a pixel $I_{ij}$ $(x+R_X, y+R_Y)$ can be predicted by calculating Expression 3 based on four real pixels $I_{ij}$ $(x, y)$ through $I_{ij}$ $(x+1, y+1)$ around the pixel $I_{ij}$ $(x+R_X, y+R_Y)$.

$V_{11}$. In the case where the minimum correlation value $R_{ij}$ (p, q) is greater than a predetermined value, the motion vector detecting section 9 can output an error value indicating that sufficient correlation is not obtained, instead of the motion vector $V_{10}$, $V_{01}$ or $V_{11}$.

The operation of the synthesis section 10 will be described.

[Expression 3]

$$Iij(x+R_X, y+R_Y) = [1 - R_Y R_Y] \begin{bmatrix} Iij(x,y) & Iij(x+1,y) \\ Iij(x,y+1) & Iij(x+1,y+1) \end{bmatrix} \begin{bmatrix} 1 - R_X \\ R_X \end{bmatrix}$$

$$= (1 - R_X)(1 - R_Y)Iij(x,y) + R_X(1 - R_Y)Iij(x+1,y) + (1 - R_X)R_Y Iij(x,y+1) + R_X R_Y Iij(x+1,y+1)$$

The linear interpolation corresponds to linear Lagrangian polynomial interpolation. Therefore, in linear Lagrangian polynomial interpolation of n degrees based on horizontally and vertically adjacent n+1 pixels, interpolation processing can be performed using quadratic or higher degree Lagrangian polynomial interpolation.

The cubic convolution is a method for performing interpolation using a cubic expression based on 16 pixels around a pixel to be interpolated. This method can be regarded as a simplified method of digital-digital conversion using oversampling and thinning out processing described above.

In addition, other interpolation methods can be used in the interpolation processing section 9d. The other interpolation methods are described in detail, for example, in "The Transactions of the Institute of Electronics and Communication Engineers of Japan", pp. 1617–1623, Vol. J69-D, No. 11, November 1986 and "IEEE Transactions on Medical Imaging", pp.31–39, Vol. MI-2, No. 1, March 1983.

After interpolation of 100 pixels $I_{ij}$ $(x_k+p, y_k+q)$ serving as representative points is performed in the interpolation processing section 9d, these pixels $I_{ij}$ $(x_k+p, y_k+q)$ are sequentially transmitted to a subtracter 9e. 100 pixels $I_{00}$ $(X_k, y_k)$ serving as representative points of the reference image $I_{00}$ are also sequentially transmitted to the subtracter 9e from the representative point memory 9c. A difference in luminance between each pixel $I_{ij}$ $(x_k+p, y_k+q)$ and each pixel $I_{ij}$ $(x_k, y_k)$ is calculated. Then, the obtained absolute value is transmitted to an adder 9g via an absolute value circuit 9f. The adder 9g adds the absolute value representing the difference in luminance to an accumulated value read out from a correlation memory 9h. The result of calculation is held as an accumulated value again. Each time a new vector (p, q) is input to the interpolation processing section 9d, the accumulated value in the correlation memory 9h is cleared to 0. Therefore, the correlation memory 9h performs a calculation expressed by Expression 2 above for calculating difference in luminance between 100 pixels $I_{ij}$ $(x_k+p, y_k+q)$ and 100 pixels $I_{00}$ $(x_k, y_k)$ for each vector (p, q) so as to obtain a correlation $R_{ij}$ (p, q) at the vector (p, q). Each value of the correlations $R_{ij}$ (p, q) after completion of accumulation is transmitted to a minimum value detecting section 9i. The minimum value detecting section 9i holds only the minimum correlation and its vector (p, q) among the correlations $R_{ij}$ (p, q) transmitted from the correlation memory 9h. Each time a different image from the images $I_{10}$, $I_{01}$ and $I_{11}$ is transmitted to the interpolation processing section 9d, the minimum value detecting section 9i externally outputs the correlation and the vector which have been held therein by that time.

As a result, the motion vector detecting section 9 obtains the vectors (p, q) with which the correlation $R_{ij}$(p, q) become minimum for the respective three images $I_{10}$, $I_{01}$ and $I_{11}$ so as to output the vectors (p, q) as motion vectors $V_{10}$, $V_{01}$ and The synthesis section 10 synthesizes the four images $I_{00}$, $I_{10}$, $I_{01}$ and $I_{11}$ transmitted from the image memory 8 based on the motion vectors $V_{01}$, $V_{10}$ and $V_{11}$ transmitted from the motion vector detecting section 9, thereby obtaining an image I. Specifically, each pixel of the four images $I_{00}$, $I_{10}$, $I_{01}$ and $I_{11}$ is subjected to coordinate transformation based on Expressions 4 through 7, thereby obtaining each pixel of the image I.

[Expression 4]

$$I(x,y)=I00(x,y)$$

[Expression 5]

$$I(x+0.5,y)=I10(x+Vx10+0.5,y+Vy10)$$

[Expression 6]

$$I(x,y+0.5)=I01(x+Vx01, y+Vy01+0.5)$$

[Expression 7]

$$I(x+0.5,y+0.5)=I11(x+Vx11+0.5,y+Vy11+0.5)$$

As is apparent from Expression 4, each pixel $I_{00}$ (x, y) of the image $I_{00}$ is allocated to each pixel I (x, y) of the image I without performing coordinate transformation. However, each pixel $I_{10}$ (x, y) of the image $I_{10}$ is transformed into a pixel $I_{10}$ $(x+V_{X10}+0.5, y+V_{Y10})$ based on the motion vector $V_{10}$ $(V_{X10}, V_{Y10})$, as expressed by Expression 5. The resultant pixel is allocated to each pixel I $(x+0.5, y)$ of the image I. In this case, the pixel $I_{10}$ $(x+V_{X10}+0.5, y+V_{Y10})$ is identical with a real pixel on the image $I_{10}$ only when the motion vector $V_{10}$ is $(-0.5, 0)$. In other words, since the pixel $I_{10}$ $(x+V_{X10}+0.5, y+V_{Y10})$ is not identical with a real pixel on the image $I_{10}$ when the subject S moves or the imaging apparatus moves due to slight movement of a hand holding the apparatus, it is necessary to displace the pixels by means of interpolation processing similar to that performed in the interpolation processing section 9d of the motion vector detecting section 9. The same can be applied to each pixel of the images $I_{01}$ and $I_{11}$.

The process for transforming each real pixel $I_{10}$ (x,y) in the image $I_{10}$ into each pixel I $(x+0.5, y)$ of the image I will be described in detail.

FIG. 8 shows the image I. Since the reference image $I_{00}$ is identical with the image I, each pixel $I_{00}$ (x, y) on the reference image $I_{00}$ corresponds to each pixel I (x, y) in FIG. 8. In the case where the subject S does not move or the imaging apparatus does not move due to movement of a hand holding the apparatus, each pixel $I_{10}$ (x, y) on the image $I_{10}$ (not in FIG. 8) corresponds to each pixel I $(x+0.5, y)$ in FIG. 8. In other words, the motion vector $V_{10}$ $(V_X, V_Y)$ is a vector $V_{10}$ $(-0.5, 0)$ in this case. Therefore, by substituting $V_x$ and $V_y$ for Expression 5, each pixel $I_{10}$ (x, y) is allocated to each pixel I (x+0.5, y) of the image I. In this case, since each pixel $I_{10}$ (x, y) is a real pixel, the interpolation processing is not needed.

FIG. 8 exemplifies the image which is moved by a vector $V_m$ ($R_X$, $R_Y$) due to movement of a hand or the like while taking the images $I_{00}$, $I_{01}$ and $I_{10}$. Thus, in FIG. 8, the position of the pixel $I_{10}$ (x, y) on the image $I_{10}$ is represented as a coordinate $I_{10}$ (x+0.5–$R_X$, y–$R_Y$), which is obtained by displacing the pixel $I_{10}$ (x, y) horizontally by (0.5–$R_X$) and vertically by (–$R_Y$).

When the motion vector of the pixel $I_{10}$ (x, y) is detected, the pixel obtained by displacing the pixel $I_{10}$ (x, y) horizontally by (–0.5+$R_X$) and vertically by ($R_Y$) has the highest correlation with the pixel $I_{00}$ (x, y) of the image $I_{00}$. Therefore, a motion vector $V_{10}$ ($V_{X10}$, $V_{Y10}$) is $V_{10}$ (–0.5+$R_X$, $R_Y$). Since the pixel I (x+0.5, y) to be obtained is a pixel obtained by displacing the pixel $I_{00}$ (x, y) by a vector (0.5, 0), the motion vector $V_{10}$ ($V_{X10}$, $V_{Y10}$)=$V_{10}$(–0.5+$R_X$, $R_Y$) and the vector (0.5, 0) are synthesized, thereby obtaining ($V_{X10}$+0.5, $V_{Y10}$)=($R_X$, $R_Y$). As a result, a vector $V_m$ ($V_{X10}$+0.5, $V_{Y10}$), which represents a vector $V_m$($R_X$, $R_Y$) indicating movement of the image using a motion vector $V_{10}$ ($V_{X10}$, $V_{Y10}$), can be obtained. In FIG. 8, the pixel I (x+0.5, y) displaced by the vector $V_m$ from the pixel $I_{10}$ (x, y) can be represented as the pixel $I_{10}$ (x+$R_X$, y+$R_Y$) for the pixel $I_{10}$ (x, y) on the image $I_{10}$, and therefore can be rewritten as $I_{10}$ (x+$V_{X10}$+0.5, y+$V_{Y10}$) Thus, when coordinate transformation expressed by Expression 5 is performed for each pixel $I_{10}$ (x, y) of the image $I_{10}$, each pixel I (x+0.5, y) of the image I can be obtained.

Assuming that a value of $R_x$ is $V_{X10}$+0.5 and a value of $R_Y$ is $V_{Y10}$ at a pixel $I_{10}$ (x+$R_X$, y+$R_Y$), the luminance of each pixel $I_{10}$ (x+$V_{X10}$+0.5, y+$V_{Y10}$) on the image $I_{10}$ can be obtained by performing the interpolation processing expressed by Expression 3, based on the four real pixels $I_{10}$ (x, y) to $I_{10}$ (x+1, y+1) around the pixel $I_{10}$ (x+$V_{X10}$+0.5, y+$V_{Y10}$).

Even in the case where the subject S does not move or the imaging apparatus does not move due to movement of a hand, the position of the image may be shifted due to an imprecise angle of inclination of the transparent refracting plate 3 in some cases. As a result, when each pixel $I_{10}$ (x, y) on the image $I_{10}$ does not precisely correspond to a pixel I (x+0.5, y) in FIG. 8, the motion vector $V_{10}$ ($V_x$, $V_y$) is not identical with a vector $V_{10}$(–0.5, 0). In this case, however, since the motion vector containing an error of the position of the image can be detected, an error can be automatically corrected by the above interpolation processing.

Thus, the image I synthesized by synthesis in the synthesis section 10, has the number of pixels obtained by both vertically and horizontally doubling the pixels of the reference image $I_{00}$ based on the three images $I_{10}$, $I_{01}$ and $I_{11}$. Thus, the horizontal and vertical resolution is doubled. In the case where the above-mentioned motion vector detecting section 9 outputs an error value indicating that a sufficient correlation is not obtained, the synthesis section 10 does not synthesize the images based on the images $I_{10}$, $I_{01}$ and $I_{11}$ causing an error, but, for example, processes the images so as to interpolate pixels by interpolation processing based on the pixels of the reference image $I_{00}$. In this case, however, the resolution is not expected to be improved based on the images producing the error value.

As described above, according to the imaging apparatus of the present example, the four images $I_{00}$, $I_{10}$, $I_{01}$ and $I_{11}$, which are obtained by vertically and horizontally displacing the imaging position on the imaging plate 4 by a half-pixel, are synthesized, thereby obtaining a synthesis image having horizontally and vertically doubled resolutions. Moreover, the motion vectors $V_{10}$, $V_{01}$ and $V_{11}$ of the respective images $I_{10}$, $I_{01}$, and $I_{11}$ are detected, and then the three images $I_{10}$, $I_{01}$ and $I_{11}$ are synthesized in accordance with the motion vectors $V_{10}$, $V_{01}$ and $V_{11}$. Therefore, even if the subject S moves or the imaging apparatus moves due to movement of a hand holding the apparatus, a shift of the position of the image can be corrected. In the case where the position of the image is imprecise, the position of the image can be simultaneously corrected based on the motion vectors $V_{10}$, $V_{01}$ and $V_{11}$.

Furthermore, in detection of the motion vectors $V_{10}$, $V_{01}$ and $V_{11}$ in the motion vector detecting section 9, most of the aliasing $A_N$ appearing in each of the images $I_{00}$, $I_{10}$, $I_{01}$ and $I_{11}$ can be removed by the digital filter 9a. As a result, degradation of the detection precision due to Moire fringes is prevented.

In the present example, the case where the imaging position is horizontally halved and vertically divided into two parts (H=2; V=2) is described. However, the position of the image can be divided into a larger number of parts. In the case where V=1, only the horizontal resolution is improved. In the case where H=1, only the vertical resolution is improved.

Although the present example is described regarding the case where a monochrome image is taken, the present invention is similarly applicable to a color imaging apparatus for imaging a color image. As the color imaging apparatus, a single plate type color imaging apparatus in which a color filter array is provided in front of a single imaging plate, or a three plate type color imaging apparatus in which imaging light is separated into three primary color beams, i.e., RGB by a color separating prism so as to be incident on three imaging plates, respectively, can be used. A value of each pixel is regarded as luminance of a scalar quantity in the above example. When a value of each pixel is regarded as a vector quantity consisting of each of RGB, the pixel value can be similarly processed. Furthermore, in the case where a motion vector is detected in the motion vector detecting section 9, a circuit size can be reduced and the operation can be simplified by converting a color image into a monochrome image (Y signals) and then detecting it.

As described above, according to the present invention, by synthesizing a plurality of images imaged in time division at different positions using an imaging plate, an image with high resolution is obtained. As a result, an inexpensive imaging plate can be used. In addition, in the case where a subject moves or an imaging apparatus moves due to slight movement of a hand holding the apparatus while imaging a plurality of images, an error in the images due to a shift of the positions of the images can be corrected to obtain an appropriate synthesized image by detecting motion vectors. Moreover, in the case where the position of each image is imprecisely displaced, such an imprecise displacement can be similarly corrected. Therefore, it is not necessary to provide a high-accuracy mechanism to displace the positions of the images.

Furthermore, by attenuating aliasing which occurs in the unsynthesized images with a filter prior to the detection of the motion vectors, a correlation can be precisely determined.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An imaging apparatus comprising:

an imaging plate having a light receiving face, on which a plurality of light receiving elements are arranged at intervals of $P_H$ ($P_H$ is a positive real number) in a first direction and at intervals of $P_v$ ($P_v$ is a positive real number) in a second direction perpendicularly crossing the first direction, for imaging the received image formed on the light receiving face during a predetermined period of time as an image constituted by a plurality of pixels, the number of pixels being independent of the number of light receiving elements;

focusing means for focusing light from a subject on the light receiving face of the imaging plate as the received image formed on the light receiving face;

image position displacing means for displacing a position of the received image formed by the focusing means with respect to a reference position by approximately $P_H \times i/H$ (H is a predetermined integer of 1 or greater; and i is an integer: 0<i <H) in the first direction and by approximately $P_v \times j/V$ (V is a predetermined integer of 1 or greater; and j is an integer: 0<j<V) in the second direction;

image position displacement control means for controlling the image position displacing means each time the imaging plate images the image so as to displace the received image to a position represented by a combination of i and j;

motion vector detecting means for detecting a motion vector of each of (N−1) images (N=H×V) with respect to a reference image, using one of N images imaged by the imaging plate as the reference image; and image synthesis means for displacing pixels constituting each of the (N−1) images by a degree obtained by synthesizing the motion vector of each of the (N−1) images detected by the motion vector detecting means and a displacement vector of the position of each of the (N−1) images with respect to the reference image, and for interpolating the displaced pixels constituting each of the (N−1) images between adjacent pixels of the reference image, thereby synthesizing the N images into a single image.

2. An imaging apparatus according to claim 1, wherein the motion vector detecting means detects a displacement of each of the (N−1) images with respect to the reference image as the motion vector.

3. An imaging apparatus according to claim 1, wherein the motion vector detecting means includes:

means for displacing pixels constituting each of the (N−1) images in the first direction and/or in the second direction so as to generate a plurality of displaced images of each of the (N−1) images; and means for detecting a displacement of a displaced image having the highest correlation with the reference image among the plurality of displaced images of each of the (N−1) images, the motion vector detecting means detecting the displacement as the motion vector of each of the (N−1) images.

4. An imaging apparatus according to claim 3, wherein the means for displacing pixels further includes interpolation means for interpolating luminance of pixels.

5. An imaging apparatus according to claim 1, wherein the motion vector detecting means includes:

means for displacing a plurality of predetermined pixels among the pixels constituting each of the (N−1) images in the first direction and/or in the second direction so as to generate a displaced image constituted only by the displaced pixels; and means for detecting a displacement of the displaced image having a minimum value obtained by accumulating a difference between each pixel of the plurality of displaced images having respectively different combinations of displacements in the first direction and the second direction and each pixel at a corresponding predetermined position in the reference image so as to detect the displacement as the motion vector of each of the (N−1) images.

6. An imaging apparatus according to claim 1, wherein the motion vector detecting means includes a filter for removing at least a high frequency component at a spatial frequency of a signal of each of the (N−1) images, and the signal is passed through the filter prior to the detection of the motion vector.

7. An imaging apparatus comprising:

an imaging plate having a light receiving face, on which a plurality of light receiving elements are arranged at intervals of $P_H$ ($P_H$ is a positive real number) in a first direction and at intervals of $P_v$ ($P_v$ is a positive real number) in a second direction perpendicularly crossing the first direction, for imaging a received image formed on the light receiving face during a predetermined period of time as an image formed of a plurality of pixels, the number of pixels being independent of the number of light receiving elements;

focusing means for focusing light from a subject on the light receiving face of the imaging plate as the received image formed on the light receiving face;

image position displacing means for displacing a position of the received image formed by the focusing means with respect to a reference position by approximately $P_H \times i/H$ (H is a predetermined integer of 1 or greater; and i is an integer: 0≦i<H) in the first direction and by approximately $P_v \times j/V$ (V is a predetermined integer of 1 or greater; and j is an integer: 0≦j<V) in the second direction;

motion vector detecting means, with respect to each pair of images among N image imaged by the imaging plate, for detecting a displaced image having the highest correlation with one of the pair of images from displaced images obtained by displacing each pixel constituting the other of the pair of images in the first direction and/or the second direction;

image synthesis means for displacing pixels constituting the one image by a degree obtained by synthesizing a motion vector obtained from the other image to the one image, which is detected by the motion vector detection means, and a displacement of a position of the one image from the other image, and for synthesizing the pair of images by repeating a process for interpolating each displaced pixel of the one image between adjacent pixels of the other image, thereby finally obtaining a single synthesized image.

* * * * *